Figure 4:
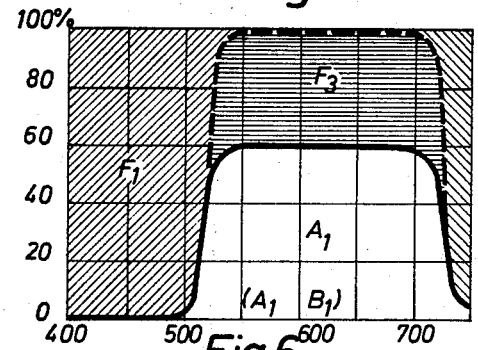
Figure 5:
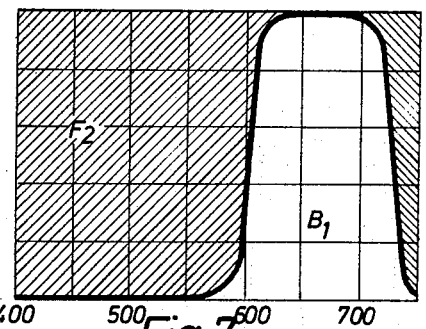

United States Patent
Lindberg

[15] 3,706,497
[45] Dec. 19, 1972

[54] METHOD AND APPARATUS FOR DETERMINING COLORIMETRIC CONCENTRATIONS

[72] Inventor: Arne Robert Lindberg, Slingergatan 18, 431 39 Molndal, Sweden

[22] Filed: Nov. 5, 1970

[21] Appl. No.: 87,079

[52] U.S. Cl. .................356/188, 250/218, 250/226
[51] Int. Cl. ................................................G01j 3/48
[58] Field of Search................250/218, 226, 210; 356/179–184, 188, 189

[56] References Cited

UNITED STATES PATENTS

| | | | |
|---|---|---|---|
| 3,171,027 | 2/1965 | Wallack | 356/189 X |
| 1,898,219 | 2/1933 | Sharp | 356/188 |
| 3,529,895 | 9/1970 | Pincus | 356/188 X |
| 2,872,588 | 2/1959 | Barton, Jr. | 250/210 |
| 3,250,174 | 5/1966 | Lutz | 356/188 X |

FOREIGN PATENTS OR APPLICATIONS

1,176,395  8/1964  Germany...........................250/226

*Primary Examiner*—Walter Stolwein
*Attorney*—Albert M. Parker, Charles G. Mueller, Larimer P. Brooks, Alfred L. Haffner, Jr., Harold Haidt and G. Thomas Delahunty

[57] ABSTRACT

A method and an apparatus for determining colorimetric concentrations wherein the difference between the light absorption of a medium in two or more different wave-length ranges is measured by means of an automatic wave-length switching, whereupon the concentration of the medium is calculated in dependence of said difference and the absolute absorption of the medium in one of the wave-length ranges.

8 Claims, 11 Drawing Figures

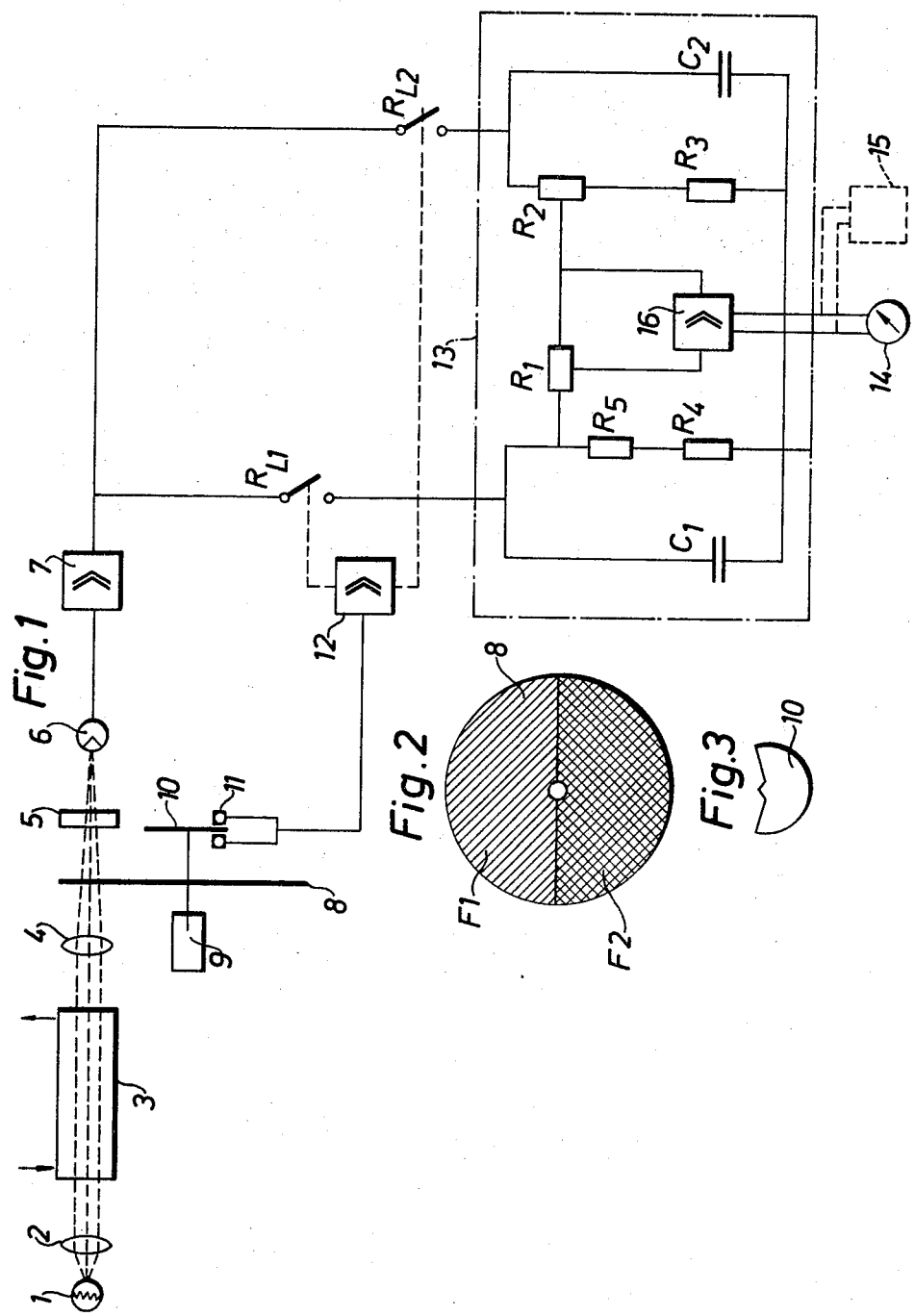

METHOD AND APPARATUS FOR DETERMINING COLORIMETRIC CONCENTRATIONS

The present invention relates to a method and means for determining colorimetric concentrations, for example of chemicals in a solution which, with or without reagent, is of a color the intensity of which is a function of its concentration.

As is known, the basic color and turbidity of the medium or the reagent is a cause of incorrect determination in all cases of determining colorimetric concentrations. In manual colorimetric analysis these sources of error can often be counteracted by, inter alia, special calibration and various types of compensation. In an automatic analysis of process media, this is not usually possible.

It has now been found possible due to the present invention to achieve such compensation automatically, as well as compensation for ageing of the light source and the electronic apparatus. Substantially characteristic of the method proposed according to the invention is that by means of automatic wave-length switching, differences are measured between the light absorption of a medium in two or more different ranges of wave-length, after which the concentration of the medium is calculated depending on the difference measured and the absolute absorption of the medium in one of the ranges of wave-length.

According to a suitable embodiment of the invention the division of the wave-lengths in the flow of light is effected by means of a rotating filter disc divided into at least two different filter sectors, in which case the absorbing medium only affects that section of the wave-length range covering one filter sector and the background absorption remains the same in both the filter sectors.

In order to carry out the method proposed according to the invention a device may suitably be used comprising a light source, a measuring bulb containing the medium for measuring the concentration, and a photo-electric element registering the light flow through the medium and arranged to cooperate with an electronic output device and being characterized in that a wave-length switching means located between the photo-electric element and the measuring bulb is arranged to generate different wave-length ranges alternately in the light flow for recording by the element and subsequent evaluation in a difference-measuring bridge.

According to a suitable embodiment of the invention the wave-length switching means suitably consists of a rotating filter disc having at least two different filter sectors.

In the following the invention will be described further with reference to the accompanying drawings in which FIG. 1 shows a diagrammatic sketch of a device according to the invention for colorimetric determination, FIG. 2 a view of the rotating filter disc which is a part of the device according to FIG. 1, FIG. 3 a detailed view of the sector disc in the device according to FIG. 1, and FIGS. 4 – 11 various diagrams showing the principal function of the filter changing system used according to the invention.

In the drawings 1 designates a light source which, through a first lens system 2, directs the flow of light through a measuring bulb 3 containing a medium to be examined. After passing through the measuring bulb 3, the light is broken up by a second lens system 4 and focused on a photo-electric element 6. The signal from the element 6 is amplified and linearized, possibly with respect to light absorption in relation to the concentration, in an amplifier 7. Between the second lens system 4 and the photo-electric element 6 is a rotating filter disc 8. The filter disc 8 has at least two different filter sectors $F_1$, $F_2$, and cooperates with a stationary compensation filter 5 arranged between the filter disc 8 and the element 6 to adjust the total light level and for final adjustment of the balance in the filter system. When the filter disc 8 rotates different ranges of wave-length of the flow of light will be allowed to pass to the photo-electric element 6 and from this a pulsating direct current is obtained which corresponds to the light absorption of the medium at these wave-lengths. The rotation of the filter disc 8 is effected by a motor 9 and, besides the filter disc 8 on the driving shaft of the motor 9, there is also a sector disc 10. A sensing device 11 is arranged near the sector disc 10 and this, via a synchronizing electronic device 12 over the relays $R_{L1}$ and $R_{L2}$, sees to it that the signal from the photo-electric element 6 is fed to one or the other half of the measuring bridge 13, depending on the position of the filter sectors $F_1$ or $F_2$ in relation to the flow of light. The voltage difference between the capacitors $C_1$ and $C_2$ in the measuring bridge 13 is measured and amplified in a final amplifier 16 and can then be fed to an indicating instrument 14 or a recorder 15. The measuring equipment is adjusted to zero by means of an adjusting resistor $R_2$ and the measuring range in question is set by a resistor $R_1$.

The function of the device is clear from FIGS. 5 – 11. Here a system according to the invention having two filter sectors $F_1$ and $F_2$ in the rotating filter disc 8 and a stationary filter (compensating filter 5) which upwardly limits the transmission range prevailing from the point of view of wave-lengths, for the two rotating filter sectors. In FIGS. 5 – 11 the compensation filter has been designated $F_3$.

A grey filter FG is also added to the filter sectors $F_1$. This is adjusted so that the flow of light, represented by the areas $A_1$ and $B_1$ in FIGS. 4 and 5, through the two filter sectors $F_1$, $F_2$, is equal. However, as is clear from FIG. 4, about 40 percent of the transmission is screened off by the grey filter FG, but a wider range of wave-lengths (ca 500 – 800 m$\mu$) is then covered by the filter sector $F_2$ (see FIG. 5 in the wave-length range of 600 – 750 m$\mu$).

Figure 6:
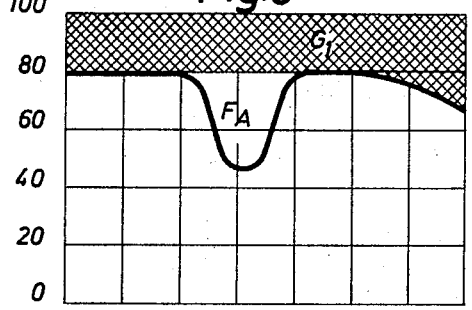
Figure 7:
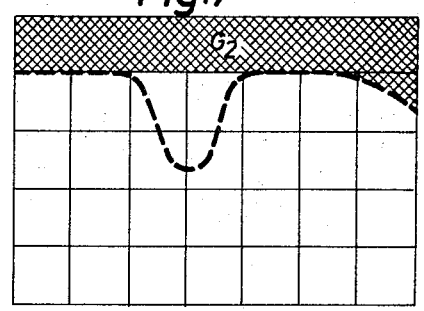
Figure 8:
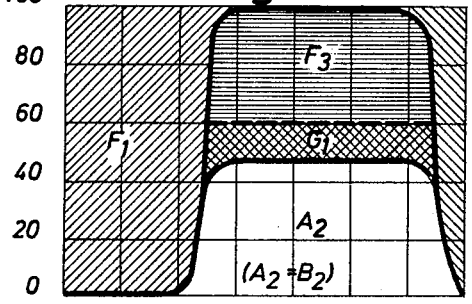
Figure 9:
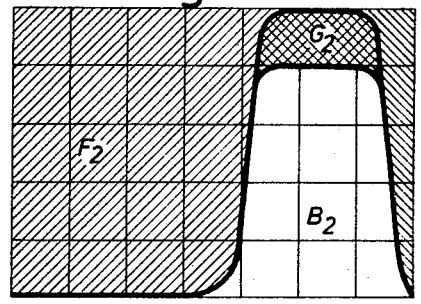

FIGS. 6 and 7 show a transmission curve for a medium having a background absorption of about 20 percent calculated on the light intensity. As well as the absorption in question from the measuring point of view — which corresponds to the area $F_A$ — the measurements in the different ranges of wave-length are affected by an absorption corresponding to the surfaces $G_1$, $G_2$ (see FIGS. 8 and 9). The background absorption of the medium, shown in FIG. 6, of 20 percent of the light intensity will be, as seen in FIG. 8, 20 percent calculated on the remaining light intensity (60 percent) after the grey filter, i.e. 12 percent, whereas the absorption in FIGS. 5 and 7 will remain the same, i.e. 20 percent of the light intensity. Since the filter sectors $F_1$, $F_2$ cover wave-length ranges of equal size matched so that the light flows, i.e. the areas $A_1$ and $B_1$, are the same size at the start, the light flows, i.e. the areas $A_2$ and $B_2$, will also be equal in size, and thus also the areas $G_1$ and $G_2$.

Figure 10:
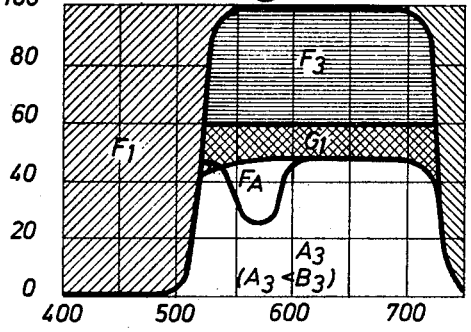
Figure 11:
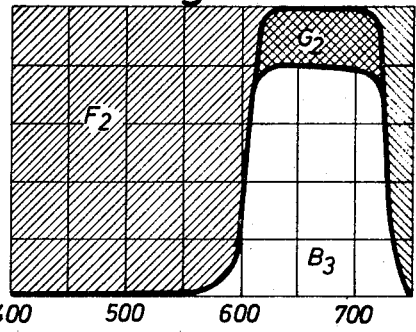

The signal level corresponding to the difference between the areas $A_1$ and $A_2$ or $B_1$ and $B_2$, is changed. On the other hand the difference of the signal level corresponding to the areas $A_2$ and $B_2$ will be unchanged upon varying background absorption. The difference in the light flow to the photo-electric element 6 measured at two different wave-length ranges, as shown above, is thus irrespective of the background absorption. When an absorbing medium, as shown in FIGS. 6 and 7, represented by the area $F_A$, only influences the part of the wave-length range covering one of the filter sectors, in this case $F_1$, but not the wave-length range of the other filter sector $F_2$, a difference arises between the areas A and B, as can be seen in FIGS. 10 and 11. This difference $A_3 - B_3$, taking into account the difference between $A_1 - A_3$, can be converted to a concentration of the medium in question. The difference $A_1 - A_3$, which represents the alteration of the absolute signal level, can control a logarithmic conversion element or automatically alter the working point with the use of a logarithmic photo-electric element. The difference between $A_3$ and $B_3$ can thus easily be converted to a concentration.

The invention described above can be used generally in all fields in which it is suitable by filters or some other division of the wave-lengths to measure the difference between two ranges of wave-lengths and has shown particularly good results in automatically determining chemical oxygen consumption with bichromate oxidation, determining the phosphorous content in waste water and chemical oxygen and consumption with potassium permanganate.

However, the invention is not limited to the embodiment shown in the drawings, but can be varied in many ways within the scope of the following claims. Thus the filter sectors may be of different sizes and the balancing of the energy to the photo-electric element may be done by grey filters, for example. Conversely, it is not always necessary to use grey filters as the system can be balanced by filter sectors of different sizes. The compensation filter described above may also have other functions and be, for example, a color filter which for special purposes adds effects to the filter sectors.

What I claim is:

1. A method of determining colorimetric concentrations in liquids comprising passing a beam of light through liquid in a measuring bulb, sequentially trimming the light transmitted through the liquid by sequentially intercepting said transmitted light with at least two absorption filter sectors of a rotating filter disc, one of said absorption filter sectors transmitting light in a wide range of wave-lengths, and another of said absorption filter sectors transmitting light only in a small range of wave-lengths within said wide range, the wave-lengths absorbed by the concentration being determined in the liquid being within the wide range but not being within the small range, balancing the flow of light energy through said filter sectors, intercepting the light passed through said filter sectors with a photo-electric cell for producing electrical signals corresponding to the light passed through the different filter sectors, and electronically comparing said signals for determining the colorimetric concentration from the difference between said signals.

2. The method of claim 1 including employing only two different filter sectors, alternately passing light through each said filter sector, synchronizing the rotation of the filter disc with relay means for segregating the electrical signals corresponding to each filter sector, and evaluating the difference between said signals with a difference measuring bridge.

3. Apparatus for determining colorimetric concentrations in liquids comprising a single light source, a measuring bulb for liquid to be examined and a photo-electric cell positioned to register light flow from said source transmitted through liquid in said bulb, a filter disc having at least two absorption filter sectors mounted for rotation to place said filter sectors sequentially in the path of light passing from said bulb to said cell, one filter sector of said filter disc passing light in a wide wave-length range including the wave-lengths absorbed by the concentration to be determined, another filter sector of said filter disc passing light only in a narrow wave-length range within said wide range, said narrow wave-length range not including the wave-lengths absorbed by the concentration to be determined, a difference measuring bridge operatively connected with said photo-electric cell for measuring differences in electrical signals produced by said cell, means for rotating said filter disc and means for synchronizing the flow of signals from said photo-electric cell to different sides of said bridge with the rotation of said disc whereby the difference measured by said bridge represents the difference between light flows through said filter sectors.

4. The apparatus of claim 3 wherein the filter sectors of said filter disc are of equal size.

5. The apparatus of claim 3 wherein the filter sectors are of different sizes and including a compensation filter for balancing light energy flowing to the photoelectric cell.

6. The apparatus of claim 3 and including a compensation filter positioned between the filter disc and the photo-electric cell.

7. The apparatus of claim 3 and including a grey filter added to one filter sector for adjusting the flow of light therethrough so that flow of light through the filter sectors is equal.

8. The apparatus of claim 3 wherein the synchronizing means comprises a sector disc mounted on the same axis with the filter disc for concurrent rotation therewith and a sensing device positioned near the sector disc for controlling the flow of signals to said different sides of the bridge by means of relays.

* * * * *